United States Patent
Ding et al.

(10) Patent No.: US 11,360,613 B2
(45) Date of Patent: Jun. 14, 2022

(54) REDUCING DISPLAY ARTIFACTS CAUSED BY A SENSING SIGNAL OF A PROXIMITY INPUT DEVICE

(71) Applicant: Synaptics Incorporated, San Jose, CA (US)

(72) Inventors: Cungang Ding, Shanghai (CN); Tracy Scott Dattalo, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/337,743

(22) Filed: Jun. 3, 2021

(65) Prior Publication Data

US 2021/0397297 A1    Dec. 23, 2021

Related U.S. Application Data

(60) Provisional application No. 63/042,263, filed on Jun. 22, 2020.

(51) Int. Cl.
*G06F 3/044* (2006.01)
*G06F 3/041* (2006.01)
*G09G 3/3266* (2016.01)

(52) U.S. Cl.
CPC .......... *G06F 3/0441* (2019.05); *G06F 3/0412* (2013.01); *G06F 3/0443* (2019.05); *G09G 3/3266* (2013.01); *G09G 2320/0266* (2013.01)

(58) Field of Classification Search
CPC .......... G09G 2320/0266; G09G 3/3266; G06F 3/0412; G06F 3/04162; G06F 3/04166; G06F 3/0441; G06F 3/0443
See application file for complete search history.

(56) References Cited

U.S. PATENT DOCUMENTS

2015/0160782 A1* 6/2015 Park ..................... G06F 3/0442
                                                    345/174

* cited by examiner

*Primary Examiner* — Lisa S Landis
(74) *Attorney, Agent, or Firm* — Ferguson Braswell Fraser Kubasta PC (57) ABSTRACT

An input device includes a display substrate and a stack of display layers disposed on the display substrate, the stack of display layers including a conductive layer. The input device further includes at least one capacitive sensing layer in the stack of display layers and a multitude of capacitive sensing electrodes disposed in the at least one capacitive sensing layer, and configured for capacitance sensing. The input device also includes a processing system configured to selectively drive the multitude of capacitive sensing electrodes to emit a first sensing signal while balancing a total current induced in the conductive layer, caused by an electromagnetic emission associated with the first sensing signal.

20 Claims, 6 Drawing Sheets

Driving Pattern I 410

Driving Pattern II 420

Driving Pattern I 430

Driving Pattern II 440

REDUCING DISPLAY ARTIFACTS CAUSED BY A SENSING SIGNAL OF A PROXIMITY INPUT DEVICE

CROSS REFERENCE TO RELATED APPLICATIONS

This application claims benefit under 35 U.S.C. § 119(e) to U.S. Provisional Patent Application Ser. No. 63/042,263, filed on Jun. 22, 2020. U.S. Provisional Patent Application Ser. No. 63/042,263 is incorporated herein by reference in its entirety.

TECHNICAL FIELD

The described embodiments relate generally to electronic devices, and more specifically, to touch sensors supporting touch input devices such as pens or styli.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may be used to detect fingers, styli, or pens.

An active stylus or pen may require synchronization to the proximity sensor device. The synchronization may be obtained by an uplink signal that is periodically emitted by the proximity sensor device. The uplink signal may indicate, to the pen, the presence of the proximity sensor. When the pen detects the uplink signal, it may activate and/or begin broadcasting. The uplink signal may interfere with a display installed in close proximity, for example, when the proximity sensor device and the display operate in a configuration of a touch display. The interference may induce visual artifacts. Similarly, other sensing signals of the proximity sensor device may also cause visual artifacts.

While reducing the voltage of the uplink signal may reduce the visual artifacts, it may also reduce a distance at which the stylus or pen may be synchronized with the proximity sensor.

SUMMARY

In general, in one aspect, one or more embodiments relate to an input device comprising: a display substrate; a stack of display layers disposed on the display substrate, the stack of display layers comprising a conductive layer; at least one capacitive sensing layer in the stack of display layers; a plurality of capacitive sensing electrodes disposed in the at least one capacitive sensing layer and configured for capacitance sensing; a processing system configured to selectively drive the plurality of capacitive sensing electrodes to emit a first sensing signal while balancing a total current induced in the conductive layer, caused by an electromagnetic emission associated with the first sensing signal.

In general, in one aspect, one or more embodiments relate to a processing system, comprising: circuitry configured to: selectively drive a plurality of capacitive sensing electrodes of a capacitive sensing component of a touch display to emit a first sensing signal while balancing a total current induced in a conductive layer of a display component of the touch display, caused by an electromagnetic emission associated with the first sensing signal.

In general, in one aspect, one or more embodiments relate to a method of operating a touch display, comprising: selectively driving a plurality of capacitive sensing electrodes of a capacitive sensing component of the touch display to emit a sensing signal while balancing a total current induced in a conductive layer of a display component of the touch display, caused by an electromagnetic emission associated with the sensing signal.

Other aspects of the disclosure will be apparent from the following description and the appended claims.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, brief summary, brief description of drawings, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods that reduce display artifacts caused by an emission of a sensing signal by an input device such as a touch sensor.

Sensing electrodes of an input device may produce electromagnetic emissions of sensing signals. These sensing signals may be used to detect input devices such as a finger, and active pen, etc. The sensing signals may have relatively high power, e.g., when emitted as an uplink signal to an active pen in proximity to the input device, and may, thus, cause display artifacts such as fluctuations in display brightness. In one or more embodiments of the disclosure, the emission of the sensing signals by the sensing electrodes may be performed such that display artifacts are minimized or avoided. A detailed description is subsequently provided in reference to the figures.

Figure 1:
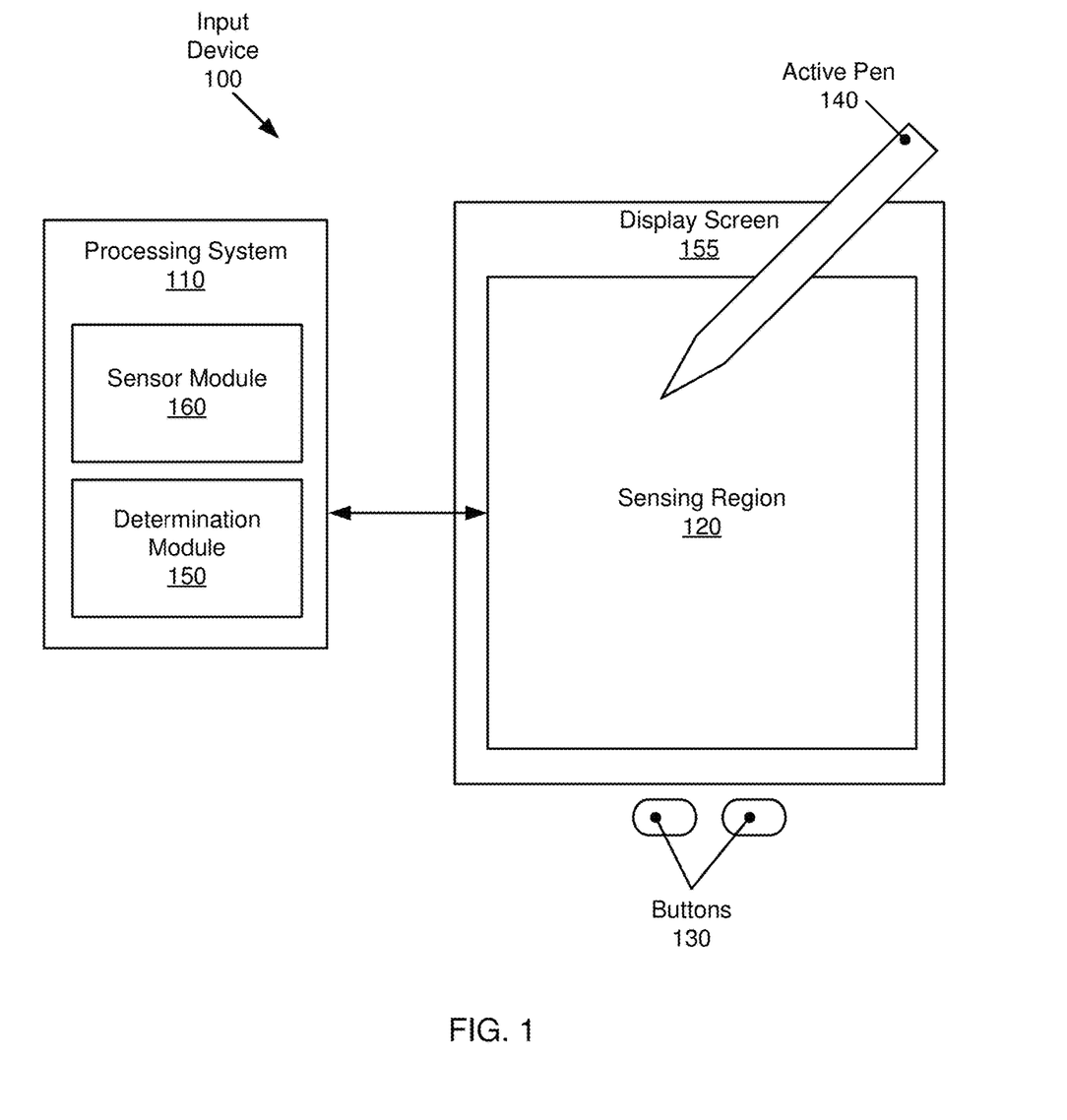
FIG. 1 shows a block diagram of an input device combined with a display device, in accordance with one or more embodiments.

Turning now to the figures, FIG. 1 shows a block diagram of an exemplary input device (100), in accordance with embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

In FIG. 1, the input device (100) is shown as a proximity sensor device (e.g., "touchpad" or a "touch sensor device") configured to sense input provided by one or more input objects (140) in a sensing region (120). Example input objects include styli, an active pen, and fingers. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. The sensing elements may be capacitive.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals (i.e., emitting sensing signals). Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry.

In some embodiments, the processing system (110) also includes electronically-readable instructions, such as firmware code, software code, and/or the like. In some embodiments, the processing system performs operations as described below in reference to FIGS. 2, 3A, 3B, 3C, 3D, 3E, 4A, 4B, 4C, 4D, 5 and 6. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens (155), driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens (155), data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2:
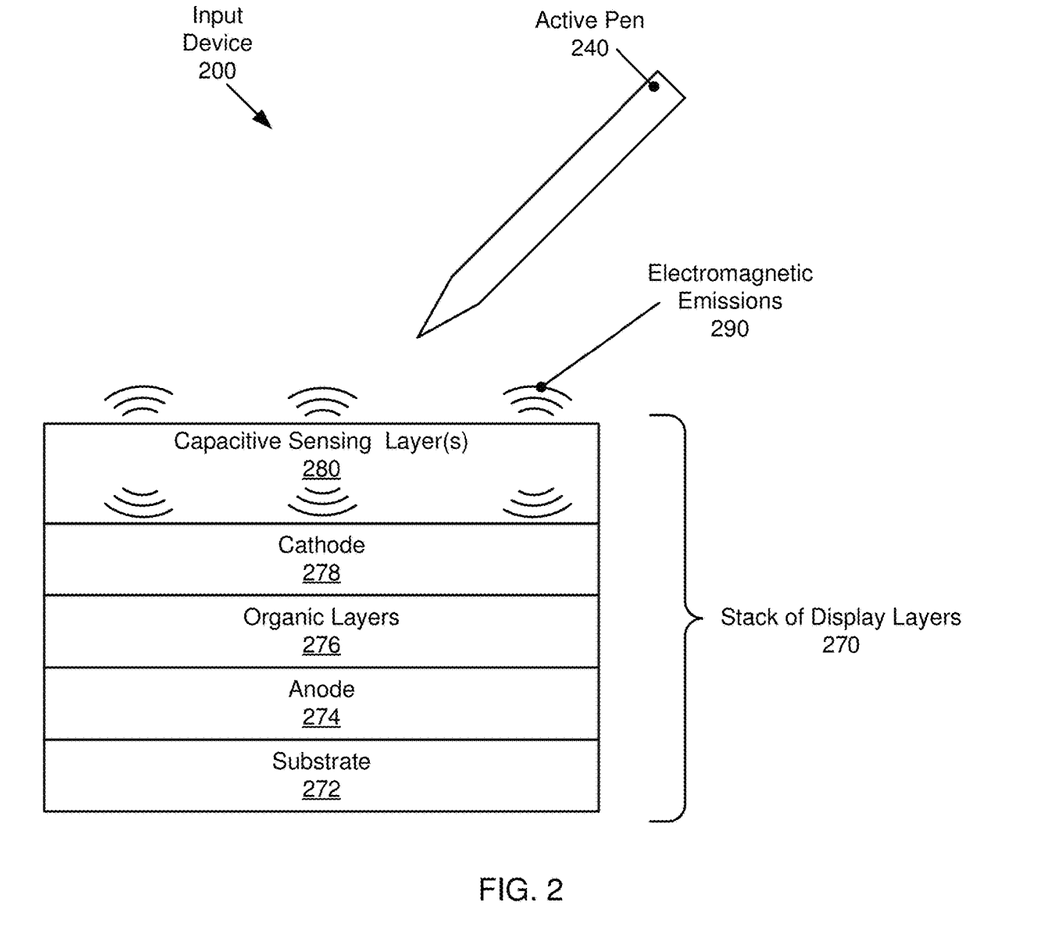
FIG. 2 shows a block diagram of an input device combined with a display device, in accordance with one or more embodiments.

FIG. 2 shows an input device (200) in accordance with one or more embodiments. As shown in FIG. 2, the input device (200) includes a stack of display layers (270), and an active pen (240).

The stack of display layers (270) may be components of the display screen (155) in FIG. 1. In one embodiment, the display layers (270) form an organic LED (OLED) display, including a substrate (272), conductive layers (e.g., including an anode (274), a cathode (278), source lines, gate lines, etc.), and one or more organic layers (276). Further the stack of display layers (270) also includes one or more capacitive sensing layers (280). The capacitive sensing layer(s) (280) may include capacitive sensing electrodes (not shown), including transmitter and receiver electrodes, as described below. When driven by the sensor module (160), the sensing electrodes may produce electromagnetic emissions (290).

In one or more embodiments, the sensing electrodes are driven to emit sensing signals, e.g., in the form of electromagnetic emissions (290) that include an uplink signal to the active pen (240). The uplink signal may be periodic and may provide a synchronization of the stylus or pen. For example, the uplink signal may be emitted every 16.67 ms with 6V peak-to-peak amplitude, using a ~1 MHz direct sequence spread spectrum (DSSS) sequence for a duration of ~200 us. Each DSSS sequence may include a number of chips, for example 31 chips, with each chip being a pulse of the DSSS sequence. Each DSSS sequence may be repeated multiple times, e.g., five times and/or a Barker code bracketing may be included, e.g., a 3-bit Barker code bracketing. Such a high-power signal may allow the stylus or pen to detect the proximity sensor. Specifically, for example, at 6V (−3V to +3V), and assuming that the uplink signal is sent on both receiver and transmitter electrodes, a pen may detect the proximity sensor from a distance of up to 30 mm. Alternatively, if only the transmitter electrodes are used for the emission of the uplink signal, the detection distance may drop to a shorter distance, e.g. 10 mm. However, this detection distance may still be sufficient for practical applications. Further lowering the voltage may result in a significant and potentially undesirable reduction of the detection distance. For example, at 3V (−1.5V to +1.5V), the detection distance may be reduced to 3 mm. Accordingly, the use of a higher voltage (e.g. 6V) is desirable. Other modulation schemes such as, for example, quadrature amplitude modulation (QAM) or differential binary phase shift keying (D-BPSK) may be used, without departing from the disclosure. Further, while the following discussion is based on a square wave signal (see, for example, FIG. 3A), any other waveform such as a sinewave, triangle wave, or any other periodic wave that exhibits orthogonal cancellation may be used, without departing from the disclosure. Because the sensing layer(s) (280) is in close proximity to the conductive layer(s) (e.g., the cathode (278)), the electromagnetic emissions (290) may induce a current in the conductive layer(s). Based on the resistance of the conductive layer(s), the induced current may cause voltage gradients across the surface of the conductive layer(s). Because the source drivers of the OLED display assume that the conductive layer(s) is/are at a constant potential, the voltage gradient may result in interference with the image displayed by the OLED display.

More specifically, the image content of the OLED display may be regularly updated by driving a gate row with one voltage and each of a set of source columns with a different voltage. The intensity of light emitted by the pixel at the row/column intersection may depend on the voltage difference between the gate and the source. A complete updating may be performed by sweeping sequentially through the gate rows. Accordingly, a voltage gradient across the conductive layer(s) that form the gate and/or the source may cause variations in the intensity of the emitted light.

In one or more embodiments, the sensing electrodes are driven for a capacitive sensing. The sensing electrodes may be driven for an absolute capacitance sensing or for a transcapacitance sensing. In either case, electromagnetic emissions (290) may result, thereby also potentially causing interference with the image displayed by the OLED display.

Accordingly, interference with the image displayed by the OLED display may be caused by any kind of driving of the sensing electrodes. While FIG. 2 shows a particular configuration of display layers of an OLED display, those skilled in the art will appreciate that embodiments of the disclosure apply to any kind of display technology with layers organized in any way, and with the sensing layers being in proximity to or being part of the display. For example, embodiments of the disclosure may be used in conjunction with an LCD display.

Figure 3A:
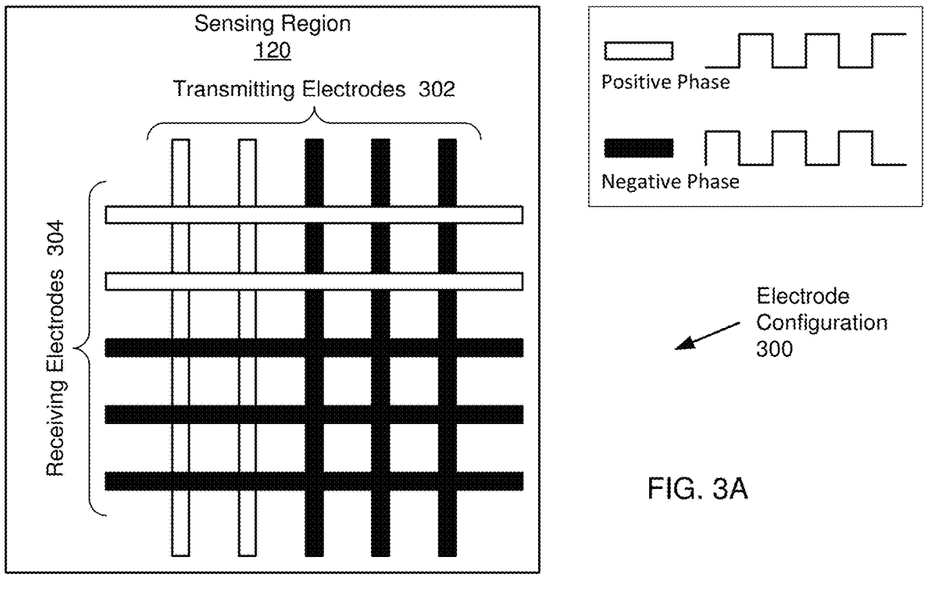
FIG. 3A shows an example of an electrode configuration in a sensing region, in accordance with one or more embodiments.
Figure 3B:
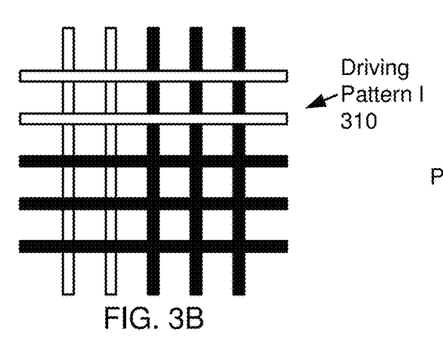
FIG. 3B, FIG. 3C, FIG. 3D, and FIG. 3E show examples of driving patterns for electrodes, in accordance with one or more embodiments.
Figure 3C:
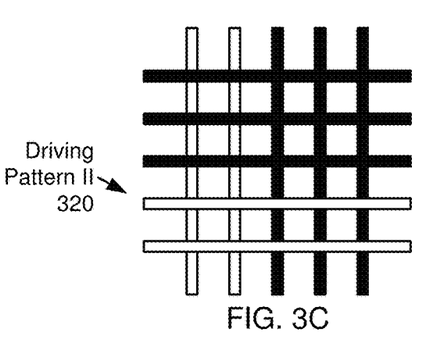
Figure 3D:
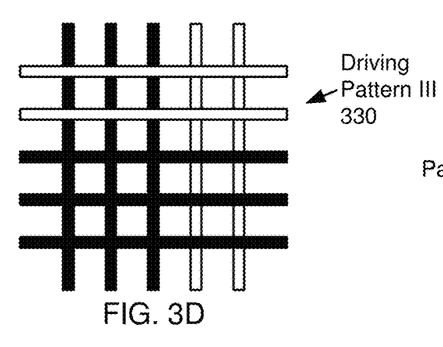
Figure 3E:
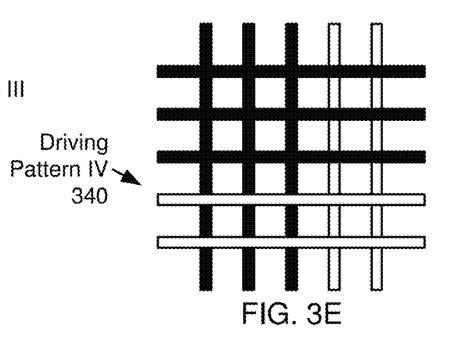

Turning to FIG. 3A, an example of an electrode configuration in a sensing region, in accordance with one or more embodiments, is shown. The sensing region may be the sensing region (120), introduced in FIG. 1. The sensing region (120) includes sensing electrodes (transmitting electrodes (302), and receiving electrodes (304). In the example, the sensing electrodes are rectangular, elongated in a vertical direction (transmitting electrodes (302)) and in a horizontal direction (receiving electrodes (304)). Other electrode shapes and/or different numbers of electrodes may be used without departing from the disclosure. For example, the electrodes may include diamond-shaped patches or other geometric shapes, connected by thin wire traces. The transmitting electrodes (302) and the receiving electrodes (304) may be located in a single layer, or may be in separate layers.

The transmitting electrodes (302) and/or receiving electrodes (304) may be driven, depending on the mode of operation, as subsequently described.

Pen Detection Mode

In a pen detection mode, the sensing electrodes may be driven with an uplink signal. The transmitting electrodes (302) and/or the receiving electrodes (304) may be driven. In one example, assume that a cathode electrode of the OLED display is a long electrode (not shown) in a vertical direction. The cathode electrode would thus cross the receiving electrodes (304).

Because the cathode electrode is elongated in the vertical direction, using different uplink signals for different regions of the display panel in a horizontal direction may reduce the interference. For example, using an uplink signal that includes a waveform with a first phase to drive electrodes in the top half of the display panel, and using an uplink signal with a second phase, 180 degrees offset relative to the first phase, to drive the electrodes in the bottom half of the display panel, the total current coupled into the cathode electrode of the display panel may be reduced, thereby reducing the visual artifacts. In the example of FIG. 3A, the top two receiving electrodes (304) are driven with a positive phase waveform, whereas the bottom three electrodes (304) are driven with a negative phase waveform. The negative phase waveform may be the inverse of the positive phase waveform. For example, for a positive phase uplink signal "10001", the corresponding negative phase uplink signal would be "01110". All receiving electrodes (304) may be driven simultaneously. In the example of FIG. 3A, only five receiving electrodes (304) are shown, with two electrodes receiving the positive phase waveform and three electrodes receiving the negative phase waveform. A complete balancing of the current coupled into the cathode electrode may thus not be accomplished, in the example. However, for a larger number of electrodes, the current coupled into the cathode electrode by the positive phase waveform would be approximately balanced by the current coupled into the cathode electrode by the negative phase waveform. The net current induced in the cathode layer may be near zero, as a result of the simultaneous emission of positive and negative phase waveforms. As shown in FIG. 3A, the same approach may be taken to obtain a near zero current in a horizontal direction by simultaneous emission of positive and negative phase waveforms on the transmitting electrodes (302). Accordingly, by driving the transmitting electrodes (302) and the receiving electrodes (304) as shown in FIG. 3A, the total current coupled into the cathode layer (or any other conductive layer of the OLED display) may be balanced out, thereby avoiding display artifacts.

Mutual Capacitance Sensing Mode

In a mutual capacitance sensing mode, the transmitting electrodes (302) may be driven with a sensing signal that is a coded pattern, while receiving on the receiving electrodes (304). The full sensing region may be scanned by sequence through a series of codes, i.e., using code division multiplexing (CDM). The codes may have certain properties to ensure uniformity, gain, etc. In one or more embodiments, a sequence of codes that have a "zero sum" is chosen. In other words, half of the transmitting electrodes may drive with one polarity while the others drive with the opposite polarity. Using such a code, the total current coupled into the cathode layer (or any other conductive layer of the OLED display) may be balanced out, thereby avoiding display artifacts.

Self Capacitance Sensing Mode

In a self-capacitance (a.k.a. absolute capacitance) sensing mode, an electrode may be driven while simultaneously sensing on the same electrode. One axis (e.g., horizontal or vertical) may be driven, while at another time the other axis may be driven. In one or more embodiments, display artifacts are reduced by driving a portion of the axis with one polarity while driving another portion with the opposite polarity. Both sets may obtain a valid signal. The total current coupled into the cathode layer (or any other conductive layer of the OLED display) may be balanced out, thereby avoiding display artifacts. A sequencing through a few patterns, and/or guarding may be used to mitigate a possible sensitivity between electrodes that is not seen by driving the whole axis.

In one or more embodiments, an active pen, when exposed to an uplink signal, may not be able to process positive phase and negative phase uplink signals. Assume, for example, that an active pen is configured to detect the negative phase uplink signal "01110". The active pen would not recognize the positive phase uplink signal "10001". Accordingly, in FIG. 3A, the active pen would function in the lower right quadrant where transmitting electrodes (302) and receiving electrodes (304) emit the negative phase uplink signal. The pen may pick up the negative phase uplink signal even when a few centimeters away from the surface of the sensing region. In the upper left quadrant, transmitting electrodes (302) and receiving electrodes (304) emit the positive phase uplink signal. Accordingly, the pen would not function in this area. In the lower left quadrant and in the upper right quadrant, a mix of positive phase and negative phase uplink signals would allow the pen to operate only when in very close proximity to the surface of the sensing region.

To obtain an acceptable detection range for all areas of the sensing region, the driving of the transmitting electrodes (302) and receiving electrodes (304) with positive phase and negative phase uplink signals may be alternated as subsequently described.

Turning to FIG. 3B, FIG. 3C, FIG. 3D, and FIG. 3E, examples of driving patterns for sensing electrodes, in accordance with one or more embodiments, are shown. The driving patterns (310, FIG. 3B), (320, FIG. 3C), (330, FIG. 3D), and (340, FIG. 3E) may be executed in a sequence. In each of the driving patterns, the quadrant with the uplink signal emission most suitable for addressing the pen is at a different location. After the execution of the sequence, each of the quadrants on the surface of the sensing region has emitted the uplink signal most suitable for addressing the pen. The sequence of driving patterns I, II, III, and IV may be continuously repeated, over time. A more detailed description of the sequential stepping through the driving patterns is provided below. Because, in the examples of FIG. 3B, FIG. 3C, FIG. 3D, and FIG. 3E, an uneven number (five) of transmitting electrodes and receiving electrodes is used, the electrodes cannot be evenly split for the purpose of driving them with either a positive phase or negative phase uplink signal. In the examples, the central transmitting electrode and the central receiving electrode are therefore always kept at a negative phase, for a pen that responds to a negative phase uplink signal. For a pen that responds to a positive phase uplink signal, the central transmitting and receiving electrodes would be kept at a positive phase.

Figure 4A:
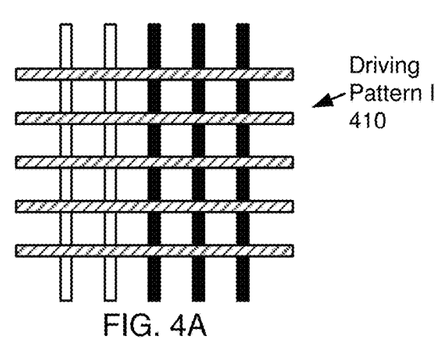
FIG. 4A, FIG. 4B, FIG. 4C, and FIG. 4D show examples of driving patterns for electrodes, in accordance with one or more embodiments.
Figure 4B:
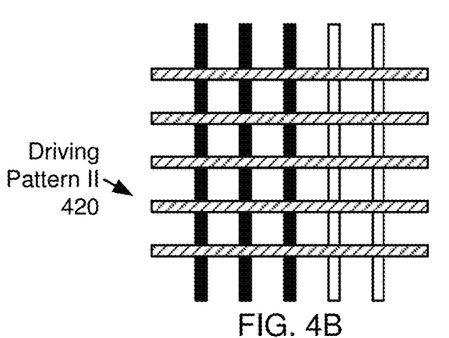

Turning to FIG. 4A and FIG. 4B, examples of driving patterns for sensing electrodes, in accordance with one or more embodiments, are shown. The driving patterns I (410, FIG. 4A) and II (420, FIG. 4B) may be executed in a sequence. Unlike in the driving patterns described in reference to FIGS. 3B, 3C, 3D, and 3E, the driving sequence includes two driving patterns, in which the driving of the transmitting electrodes (vertically extending, in the example) is alternated as shown, whereas the driving of the receiving electrodes (horizontally extending, in the example) is not alternated. For example, the receiving electrodes may be excluded from driving by configuring them as high impedance, holding them to a ground potential or to any other potential. The sequence of driving patterns I and II (410, 420) may be continuously repeated, over time. The interaction of an active pen with the sensing region driven according to the driving patterns (410, 420) may be as previously described, e.g., in reference to FIGS. 3B, 3C, 3D, and 3E.

Figure 4C:
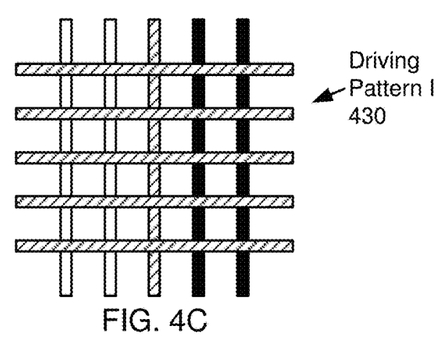
Figure 4D:
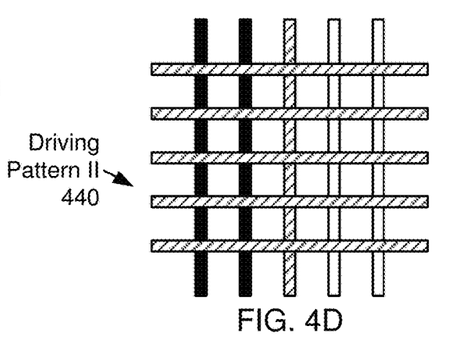

Turning to FIG. 4C and FIG. 4D, examples of driving patterns for sensing electrodes, in accordance with one or more embodiments, are shown. The driving patterns I (430, FIG. 4C) and II (440, FIG. 4D) are different from the driving patterns I (410) and II (420) of FIGS. 4A and 4B in that in driving patterns I (430, FIG. 4C) and II (440, FIG. 4D) the center transmitting electrode is not driven (i.e., excluded from driving). In contrast, in driving patterns I (410) and II (420), the center transmitting electrode is always driven with a negative phase uplink signal. Alternatively, the center transmitting electrode in driving patterns I (410) and II (420) may always be driven with a positive phase uplink signal. Driving patterns I (430, FIG. 4C) and II (440, FIG. 4D) may otherwise be similar to driving patterns I (410) and II (420).

The driving patterns I and II (410, 420) of FIGS. 4A and 4B, and the driving patterns I and II (430, 440) of FIGS. 4C and 4D may be beneficial, e.g., when used in conjunction with an OLED panel or other type of display panel, based on the geometric arrangement of the components of the display panel. Consider the following example: In an OLED panel, gate lines traverse the display panel in a horizontal direction, parallel to the receiving electrodes, and source lines traverse the display panel in a vertical direction, parallel to the transmitting electrodes. Further, source and gate lines are not equally sensitive to interference by electric emissions associated with an uplink signal to an active pen.

In the example, affecting the charging of the OLED pixel capacitors $C_{st}$ via the source lines may be avoided because the charging of $C_{st}$ may be performed during a very brief initialization time interval. Temporal overlap with the driving of the transmitting electrodes may be avoided by properly coordinating the timing between the charging of $C_{st}$ and the driving of the transmitting electrodes. Accordingly, having source lines in parallel and in close proximity to the transmitting electrodes may not cause a variation of the voltage on $C_{st}$. However, in the example, the gate lines are vulnerable to interference, thus potentially causing visual artifacts, e.g., brightness fluctuations, if unmitigated.

In the described example, the used of the driving patterns I and II (410, 420) of FIGS. 4A and 4B or driving patterns I and II (430, 440) of FIGS. 4C and 4D may be used to mitigate the interference. Specifically, by not driving the receiving electrodes, the receiving electrodes do not produce interference. Further, by alternating between patterns I and II, the total current coupled into the gate lines, by the transmitting electrodes crossing the gate lines, is balanced, e.g., near net-zero. As previously noted, the source lines may not be susceptible to interference, due to the temporal separation.

While not shown, the driving patterns shown in FIGS. 4A, 4B, 4C, and 4D may be modified in various ways. For example, the driving pattern may include any number of transmitting electrodes and any number of receiving electrodes. Any number of the transmitting electrodes may be driven. For example, in one particular configuration, a minimum of two transmitting electrodes may be driven, whereas all other transmitting electrodes may be excluded from the driving. Further, the transmitting electrodes that are driven may be located anywhere in the sensing region. For example, the driving may be limited to transmitting electrodes located in regions where they do not cause interference with the updating of the display screen to further avoid interference. Regions in the display screen that are not susceptible to interference may be regions of the display screen that are not currently being updated. Whether and/or when a region of the display screen is updated may be determined based on a known timing of the display screen.

While the above description refers to sensor designs in which electrodes are organized in rows and columns, the cycling through different patterns is also applicable to other sensor designs, such as matrix sensors.

Also, while the description refers to an active pen that is configured to detect a negative phase uplink signal, those skilled in the art will appreciate that the described concepts are equally applicable to an active pen configured to detect a positive phase uplink signal. Further, even an active pen configured to detect negative and positive phase uplink signals would benefit from the described DSSS encodings, while not being impacted by the delay resulting from cycling through the described sequence of driving patterns. Broadly speaking, embodiments of the disclosure, involve driving one set of electrodes with a signal with a first phase, and driving another set of electrodes with a signal with a second phase, 180 degrees offset relative to the first phase, to reduce the total current coupled into the cathode electrode of the display panel, and/or other conductive structures in close proximity Those skilled in the art will appreciate that the driving of the sets of electrodes may be altered, without departing from the disclosure. For example, the first and the second phase may differ by a value different from 180 degrees, for example, 170 degrees, or 190 degrees, while still obtaining a significant reduction of the total current coupled into the cathode electrode of the display panel. Also, other driving schemes that involve phase offsets that are significantly different from 180 degrees may be used. For example, four sets of electrodes may be driven with signals that have a phase offset of 90 degrees.

Figure 5:
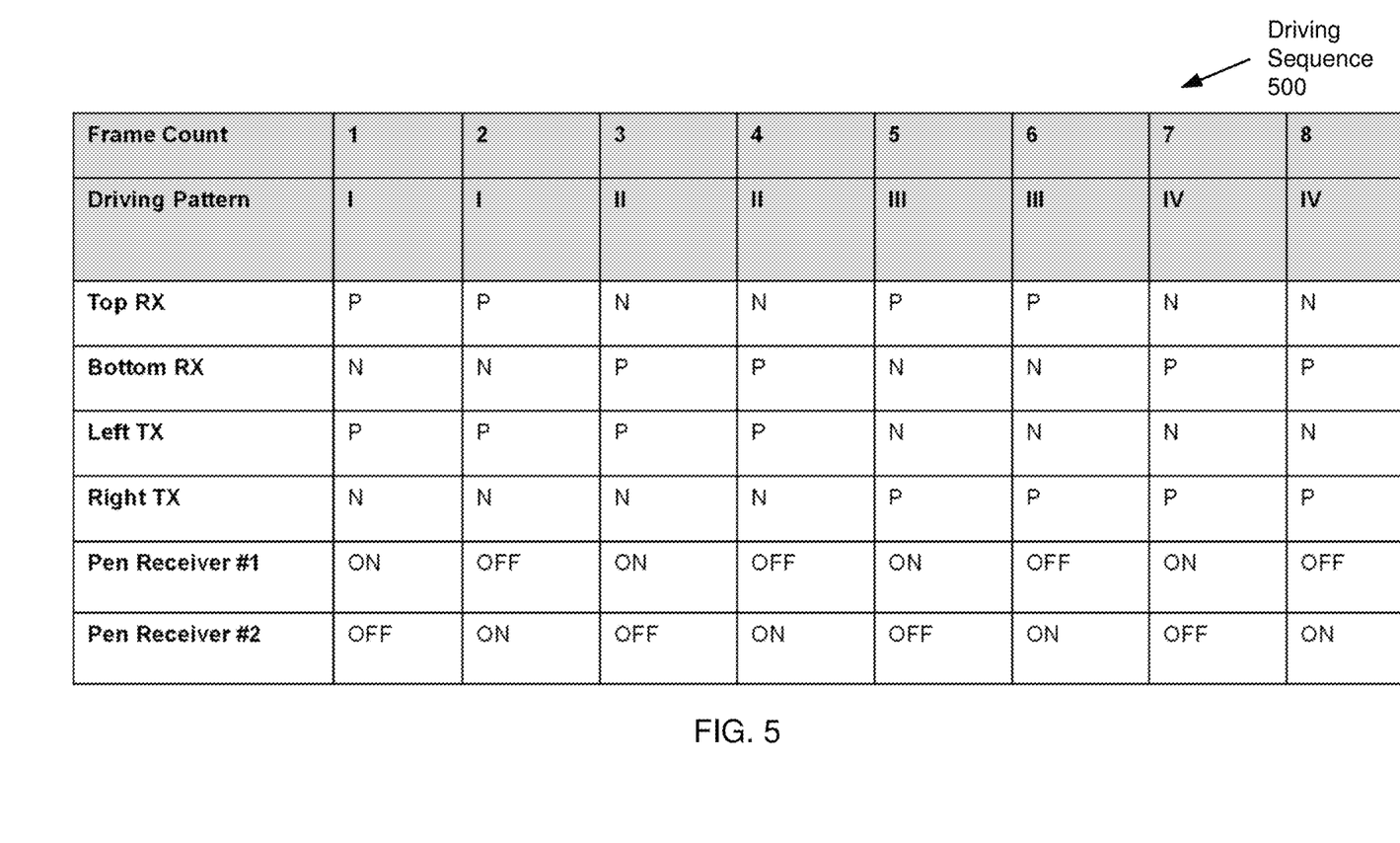
FIG. 5 shows a driving sequence, in accordance with one or more embodiments.

Turning to FIG. 5, a driving sequence (500), in accordance with one or more embodiments, is shown. For the purpose of describing the driving sequence (500), it is assumed that a pen checks for an uplink signal every 16.666 ms (60 times per second). More generally, a pen may check for an uplink signal at regular intervals every n ms or at irregular intervals. Further, assume that each of the driving patterns (driving patterns I, II, III, and IV in FIG. 3B, FIG. 3C, FIG. 3D, and FIG. 3E) occurs for 8.333 ms (120 times per second). To ensure that the pen, despite the reduced rate of checking for the pattern at 60 Hz, sees each of the driving patterns, each driving pattern is emitted twice. Accordingly, the driving sequence (500) includes a frame 1 with driving pattern I, a frame 2 with driving pattern I, a frame 3 with driving pattern II, a frame 4 with driving pattern II, a frame 5 with driving pattern III, etc. After completion of the driving sequence (500), the driving sequence may be repeated. For each of these driving patterns, the top RX, bottom RX, left TX, and right TX may be driven with the positive phase or negative phase uplink signals, as previously described with reference to FIG. 3B, FIG. 3C, FIG. 3D, and FIG. 3E. In the table of FIG. 5, a first example pen may catch the first of the two repetitive frames. Accordingly, the timing of pen receiver #1 would allow it to catch frames 1, 3, 5, and 7. A second example pen may catch the second of the two repetitive frames. Accordingly, the timing of pen receiver #2 would allow it to catch frames 2, 4, 6, and 8. Which one of the driving patterns a pen receiver actually receives may also depend on the location (quadrant of the sensing region). For example, a pen receiver #1 that responds to a negative phase uplink signal, would respond to frame 7 when in the top left quadrant, a pen receiver #2 that responds to a negative phase uplink signal would respond to frame 8 when in the top left quadrant, this pen receiver. None of the other frames may be seen, unless the pen moves to another quadrant. Accordingly, the duration between receive uplink signals may be up to 8*8.333 ms. With sufficiently accurate oscillators, a drift between the timing of the input device and the timing of the pen may be kept in an acceptable range, during that time interval.

Those skilled in the art will appreciate that the example in FIG. 5 is for a specific timing of the input device and the pen. Other timings are within the scope of the disclosure. For example, each of the driving patterns may be active during a time interval that is not necessarily 8.333 ms, the checking for an uplink signal by the pen is not limited to 60 Hz, etc. As a result, in other configurations, it may not be necessary to repeat each of the driving patterns. Alternatively, additional repetitions of each of the driving patterns may be necessary.

A similar but simpler driving sequence may be implemented if only the TX electrodes are used for the emission of the uplink signal (e.g., as shown in FIGS. 4A and 4B, and in FIGS. 4C and 4D). Specifically, only four instead of eight frames may be used to alternate between a first pattern and a second pattern, as previously described.

In one embodiment of the disclosure, once the pen is actively communicating with the input device, e.g., when on the surface of the input device, the input device may be able to detect the location of the pen. Once the location of the pen is known, a driving pattern may be chosen to always provide the optimal driving pattern for the pen, based on the current location of the pen. For example, for a pen that responds to a negative phase uplink signal, both transmitting and receiving electrodes in the quadrant where the pen is currently located may be driven with the negative phase uplink signal. Accordingly, the driving sequence of FIG. 5 may be adjusted based on the known location of the pen.

Figure 6:
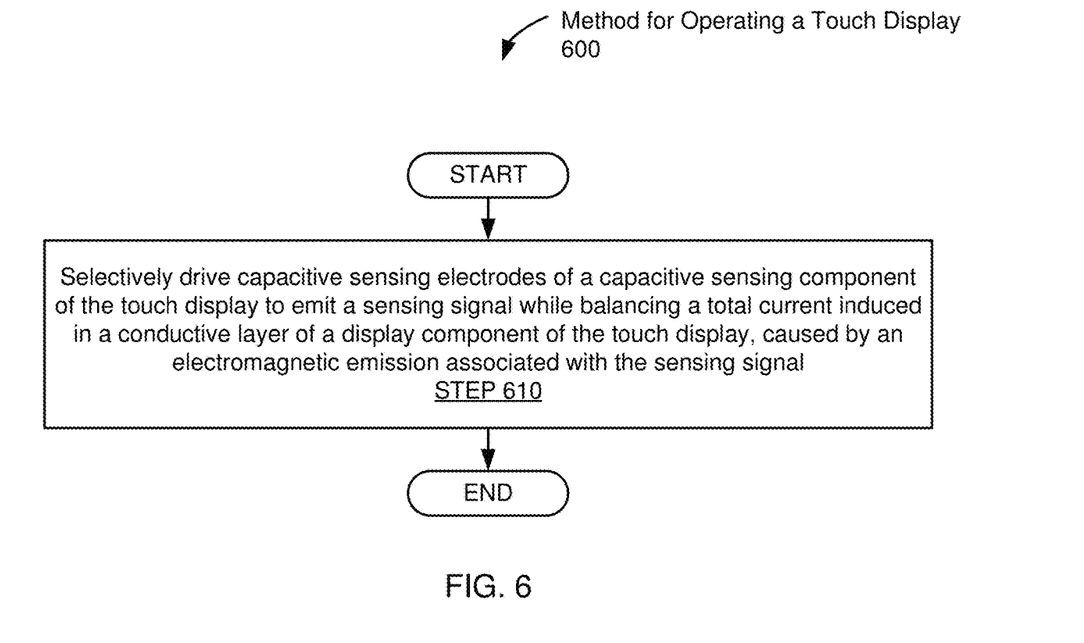
FIG. 6 shows a method for operating a touch display, in accordance with one or more embodiments.

Turning to FIG. 6 a flowchart in accordance with one or more embodiments is shown. Additional steps may be performed. Accordingly, the scope of the disclosure should not be considered limited to the specific arrangement of steps shown in FIG. 6.

Step 610 summarizes a method for operating an input device such as a touch display. The execution of Step 610 may result in the operations as previously described, including the driving of capacitive sensing electrodes of a capacitive sensing component (e.g., a touch sensor) of the touch display in a coordinated manner to balance the current induced in a conductive layer of a display component (e.g., an OLED display), thereby reducing or avoiding visual artifacts in the display output. The details of Step 610 are provided in reference to FIGS. 2, 3A, 3B, 3C, 3D, 3E, 4A, 4B, 4C, 4D, and 5.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device comprising:
   a display substrate;
   a stack of display layers disposed on the display substrate, the stack of display layers comprising a conductive layer;
   at least one capacitive sensing layer in the stack of display layers;
   a plurality of capacitive sensing electrodes disposed in the at least one capacitive sensing layer and configured for capacitance sensing; and
   a processing system configured to selectively drive the plurality of capacitive sensing electrodes to emit a first sensing signal while balancing a total current induced in the conductive layer, caused by an electromagnetic emission associated with the first sensing signal.

2. The input device of claim 1, wherein the first sensing signal is an uplink signal for a pen.

3. The input device of claim 1, wherein the processing system is further configured to drive the plurality of capacitive sensing electrodes to emit a second sensing signal for touch sensing.

4. The input device of claim 1, wherein selectively driving the plurality of capacitive sensing electrodes comprises:
   driving a first subset of the plurality of capacitive sensing electrodes with a first waveform, and
   driving a second subset of the plurality of capacitive sensing electrodes with a second waveform,
   wherein the second waveform is an inverse of the first waveform.

5. The input device of claim 4,
   wherein the plurality of capacitive sensing electrodes comprises transmitting electrodes for touch sensing and receiving electrodes for touch sensing,
   wherein the first subset of the plurality of capacitive sensing electrodes and the second subset of the plurality of capacitive sensing electrodes are selected from the transmitting electrodes.

6. The input device of claim 5,
   wherein the first subset of the plurality of capacitive sensing electrodes and the second subset of the plurality of capacitive sensing electrodes exclude the receiving electrodes.

7. The input device of claim 5,
   wherein a combination of the first subset of the plurality of capacitive sensing electrodes and the second subset of the plurality of capacitive sensing electrodes excludes at least one of the transmitting electrodes.

8. The input device of claim 4, wherein selectively driving the plurality of capacitive sensing electrodes further comprises:
   alternatingly driving the first and the second subsets of the plurality of capacitive sensing electrodes with the first and the second waveform to obtain an alternating spatial pattern of the electromagnetic emission.

9. The input device of claim 8, wherein alternatingly driving the first and the second subsets of the plurality of capacitive sensing electrodes comprises:
   after driving the first and second subsets of the capacitive sensing electrodes with the first and second waveforms, respectively:
      driving the first subset of the plurality of capacitive sensing electrodes with the second waveform, and
      driving the second subset of the plurality of capacitive sensing electrodes with the first waveform.

10. The input device of claim 1, wherein the first sensing signal comprises a direct sequence spread spectrum (DSSS) sequence.

11. The input device of claim 1, wherein the conductive layer is a cathode layer of an organic LED display.

12. The input device of claim 1, wherein the conductive layer comprises a plurality of gate lines of an organic LED display.

13. A processing system, comprising:
    circuitry configured to:
       selectively drive a plurality of capacitive sensing electrodes of a capacitive sensing component of a touch display to emit a first sensing signal while balancing a total current induced in a conductive layer of a display component of the touch display, caused by an electromagnetic emission associated with the first sensing signal.

14. The processing system of claim 13, wherein the first sensing signal is an uplink signal for a pen.

15. The processing system of claim 13, further configured to:
    drive the plurality of capacitive sensing electrodes to emit a second sensing signal for touch sensing.

16. The processing system of claim 13, wherein selectively driving the plurality of capacitive sensing electrodes comprises:
  driving a first subset of the plurality of capacitive sensing electrodes with a first waveform, and
  driving a second subset of the plurality of capacitive sensing electrodes with a second waveform,
  wherein the second waveform is an inverse of the first waveform.

17. The processing system of claim 16,
  wherein selectively driving the plurality of capacitive sensing electrodes further comprises:
  alternatingly driving the first and the second subsets of the plurality of capacitive sensing electrodes with the first and the second waveform to obtain an alternating spatial pattern of the electromagnetic emission.

18. The processing system of claim 17,
  wherein alternatingly driving the first and the second subsets of the plurality of capacitive sensing electrodes comprises:
  after driving the first and second subsets of the capacitive sensing electrodes with the first and second waveforms, respectively:
    driving the first subset of the plurality of capacitive sensing electrodes with the second waveform, and
    driving the second subset of the plurality of capacitive sensing electrodes with the first waveform.

19. A method of operating a touch display, comprising:
  selectively driving a plurality of capacitive sensing electrodes of a capacitive sensing component of the touch display to emit a sensing signal while balancing a total current induced in a conductive layer of a display component of the touch display, caused by an electromagnetic emission associated with the sensing signal.

20. The method of claim 19, wherein selectively driving the plurality of capacitive sensing electrodes comprises:
  driving a first subset of the plurality of capacitive sensing electrodes with a first waveform, and
  driving a second subset of the plurality of capacitive sensing electrodes with a second waveform,
  wherein the second waveform is an inverse of the first waveform.

* * * * *